(12) United States Patent
Lo et al.

(10) Patent No.: US 10,853,668 B1
(45) Date of Patent: *Dec. 1, 2020

(54) 3D POSITION ESTIMATION OF OBJECTS FROM A MONOCULAR CAMERA USING A SET OF KNOWN 3D POINTS ON AN UNDERLYING SURFACE

(71) Applicant: Waymo LLC, Mountain View, CA (US)

(72) Inventors: Wan-Yen Lo, Mountain View, CA (US); David I. Ferguson, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/227,074

(22) Filed: Dec. 20, 2018

Related U.S. Application Data (63) Continuation of application No. 15/379,757, filed on Dec. 15, 2016, now Pat. No. 10,198,641, which is a
(Continued)

(51) Int. Cl.
*G06K 9/00* (2006.01)
*G06K 9/62* (2006.01)
(Continued)

(52) U.S. Cl.
CPC ............ *G06K 9/00798* (2013.01); *B60R 1/00* (2013.01); *B60R 11/04* (2013.01); *B60W 30/00* (2013.01);
(Continued)

(58) Field of Classification Search
CPC ..... G06F 3/0325; G06F 3/0425; G06T 19/00; G06T 17/05; G06T 17/00; G06T 2200/04; G06T 15/205; A61B 8/466; G05D 1/0088; G05D 1/00; G05D 1/0038; G05D 1/12; G05D 2201/0213; G05D 3/00
See application file for complete search history.

(56) References Cited

U.S. PATENT DOCUMENTS

| | | | |
|---|---|---|---|
| 6,493,458 B2 * | 12/2002 | Yasui | G05D 1/0246 382/104 |
| 6,697,761 B2 * | 2/2004 | Akatsuka | G01B 11/24 702/150 |

(Continued)

*Primary Examiner* — Samantha (Yuehan) Wang
(74) *Attorney, Agent, or Firm* — McDonnell Boehnen Hulbert & Berghoff LLP (57) ABSTRACT

Disclosed herein are methods and systems for determining a location of an object within an environment. An example method may include determining a three-dimensional (3D) location of a plurality of reference points in an environment, receiving a two-dimensional (2D) image of a portion of the environment that contains an object, selecting certain reference points from the plurality of reference points that form a polygon when projected into the 2D image that contains at least a portion of the object, determining an intersection point of a ray directed toward the object and a 3D polygon formed by the selected reference points, and based on the intersection point of the ray directed toward the object and the 3D polygon formed by the selected reference points, determining a 3D location of the object in the environment.

17 Claims, 8 Drawing Sheets

Related U.S. Application Data continuation of application No. 13/952,853, filed on Jul. 29, 2013, now Pat. No. 9,558,584.

(51) Int. Cl.
*B60R 11/04* (2006.01)
*B60W 30/00* (2006.01)
*G06T 17/10* (2006.01)
*G06T 15/20* (2011.01)
*G06T 7/70* (2017.01)
*G06T 7/50* (2017.01)
*G05D 1/02* (2020.01)
*G05D 1/00* (2006.01)
*G01C 21/00* (2006.01)
*B60R 1/00* (2006.01)

(52) U.S. Cl.
CPC ......... *G01C 21/005* (2013.01); *G05D 1/0088* (2013.01); *G05D 1/0238* (2013.01); *G05D 1/0246* (2013.01); *G05D 1/0274* (2013.01); *G06K 9/6267* (2013.01); *G06T 7/50* (2017.01); *G06T 7/70* (2017.01); *G06T 15/20* (2013.01); *G06T 15/205* (2013.01); *G06T 17/10* (2013.01); *B60R 2300/301* (2013.01); *B60R 2300/8093* (2013.01); *G06T 2207/30256* (2013.01)

(56) References Cited

U.S. PATENT DOCUMENTS

| | | | |
|---|---|---|---|
| 2007/0219720 A1* | 9/2007 | Trepagnier | B60W 30/00 701/300 |
| 2009/0292468 A1* | 11/2009 | Wu | G01S 13/726 701/301 |
| 2010/0097372 A1* | 4/2010 | Gies | G06T 15/06 345/419 |

* cited by examiner

Top View

3D POSITION ESTIMATION OF OBJECTS FROM A MONOCULAR CAMERA USING A SET OF KNOWN 3D POINTS ON AN UNDERLYING SURFACE

CROSS-REFERENCE TO RELATED APPLICATION

The present disclosure is a continuation of both U.S. patent application Ser. No. 15/379,757, filed on Dec. 15, 2016 and U.S. patent application Ser. No. 13/952,853, filed on Jul. 29, 2013, and both entitled "3D Position Estimation of Objects from a Monocular Camera using a Set of Known 3D Points on an Underlying Surface," the entire contents of which are herein incorporated by reference as if fully set forth in this description.

BACKGROUND

Vehicles can be configured to operate in an autonomous mode in which the vehicle navigates through an environment with little or no input from a driver. Such autonomous vehicles can include one or more sensors that are configured to detect information about the environment in which the vehicle operates. The vehicle and its associated computer-implemented controller use the detected information to navigate through the environment. For example, if the sensor(s) detect that the vehicle is approaching an obstacle, as determined by the computer-implemented controller, the controller may adjust the directional controls of the vehicle to cause the vehicle to navigate around the obstacle.

SUMMARY

Within examples, methods and systems are provided for determining the location of objects within an environment, such as an environment of an autonomous vehicle. A three-dimensional (3D) location of reference points with the environment may first be determined. A two-dimensional (2D) image of a portion of the environment that contains an object may be received. Some of the reference points may then be selected that form a polygon when projected into the 2D image that contains the object. An intersection point of a ray directed toward the object and a 3D polygon formed by the selected reference points may be determined. Based on the intersection point, a 3D location of the object may then be determined.

In a first aspect a method is provided. The method may include determining a three-dimensional (3D) location of a plurality of reference points in an environment, receiving a two-dimensional (2D) image of a portion of the environment that contains an object, selecting certain reference points from the plurality of reference points that form a polygon when projected into the 2D image that contains at least a portion of the object, determining an intersection point of a ray directed toward the object and a 3D polygon formed by the selected reference points, and based on the intersection point of the ray directed toward the object and the 3D polygon formed by the selected reference points, determining a 3D location of the object in the environment.

In a second aspect a vehicle is provided. The vehicle may include a camera configured to capture a 2D image of a portion of an environment that contains an object, and a computing system configured to determine a 3D location of a plurality of reference points in the environment, select certain reference points from the plurality of reference points that form a polygon when projected into the 2D image that contains at least a portion of the object, determine an intersection point of a ray directed toward the object and a 3D polygon formed by the selected reference points, and based on the intersection point of the ray directed toward the object and the 3D polygon formed by the selected reference points, determine a 3D location of the object in the environment.

In a third aspect, a non-transitory computer readable medium having stored therein instructions that when executed by a computing system, cause the computing system to perform functions is disclosed. The functions may include determining a three-dimensional (3D) location of a plurality of reference points in an environment, receiving a two-dimensional (2D) image of a portion of the environment that contains an object, selecting certain reference points from the plurality of reference points that form a polygon when projected into the 2D image that contains at least a portion of the object, determining an intersection point of a ray directed toward the object and a 3D polygon formed by the selected reference points, and based on the intersection point of the ray directed toward the object and the 3D polygon formed by the selected reference points, determining a 3D location of the object in the environment.

In a fourth aspect, example systems may provide means for determining a three-dimensional (3D) location of a plurality of reference points in an environment, means for receiving a two-dimensional (2D) image of a portion of the environment that contains an object, means for selecting certain reference points from the plurality of reference points that form a polygon when projected into the 2D image that contains at least a portion of the object, means for determining an intersection point of a ray directed toward the object and a 3D polygon formed by the selected reference points, and based on the intersection point of the ray directed toward the object and the 3D polygon formed by the selected reference points, means for determining a 3D location of the object in the environment.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

For vehicles operating in an autonomous mode, determining the distance to objects on the road or within the environment of the vehicle may be helpful. At times, it may be desirable to use one or more cameras on the vehicle to detect the presence of an object, such as a flare on the road. Cameras may periodically scan the environment in which the vehicles are operating and capture images that may contain nearby objects. Generally, the images may contain two-dimensional (2D) representations of objects. In some examples, a direction through space toward an object may be determined from a 2D picture, but the depth (or distance to the object) may not be easily discernible.

Disclosed herein are methods and systems that may allow for the determination of the three-dimensional (3D) position of objects within an environment, such as an environment of an autonomous vehicle. From the 3D position, the distance to an object from the vehicle may also be computed. In some examples, this information may be used to provide instructions to control the vehicle (e.g., to maneuver the vehicle in time to avoid an obstacle on the road).

A set of 3D reference points on the underlying surface of an environment may first be stored in order to aid in the computation of the 3D locations of detected objects. For instance, the reference points may be points sampled from continuous curves representing the lane boundaries on a road. In further examples, 3D location information may also be determined for other reference points in the environment, such as points on a bridge crossing over a road, points on street signs, or points on buildings.

In an example scenario, a 2D image of a portion of the environment containing an object may be captured by a camera, such as a camera coupled to an autonomous vehicle. Next, some of the 3D reference points may be projected into the 2D image of the environment. Several of the reference points may be selected such that the reference points form a polygon, such as a triangle, that surrounds the object in the 2D image. For instance, one or more 2D point-in-polygon tests may be performed in order to determine reference points making up a polygon that surrounds the object.

Once the object has been localized within a polygon, the 3D position of the object can be determined using the previously stored 3D locations of the reference points making up the polygon. For instance, the 3D location of the object may be determined by computing the intersection point of a ray from the car to the object and the polygon (or a plane that contains the polygon) in 3D space. By first determining the polygon using the 2D image, only a single ray-plane intersection may need to be computed.

In some embodiments, the chosen polygon may not be unique because multiple polygons may be formed from the reference points that each encompass the same object in the 2D image. In some examples, reference points may be considered for the polygon based on their distance from the object within the 2D image. In additional embodiments, a smallest polygon containing the object may be determined. By using a smaller polygon, the estimation may be more accurate.

In further examples, an object may be too big to be contained by a polygon formed by reference points within the 2D image. Instead, the location of a particular portion of the object, or individual points on the object, may be computed. For instance, instead of estimating the location of a car in space, the location of the four tires of the car may instead be estimated.

In one example embodiment, the reference points may be points on a relatively flat surface such as a road and the object may be located on the road. In other embodiments, different reference points may be used to locate objects in other positions. For instance, reference points on the ground and separate reference points on a bridge above the ground may be used to estimate the location of an object located between the ground and the bridge.

Utilizing the methods and systems described herein may facilitate the task of determining the location of objects within the environment of an autonomous vehicle in a computationally efficient manner.

Example systems will now be described in greater detail. Generally, an example system may be implemented in or may take the form of a computing device. However, an example system may also be implemented in or take the form of other devices or may be included within vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

Figure 1:
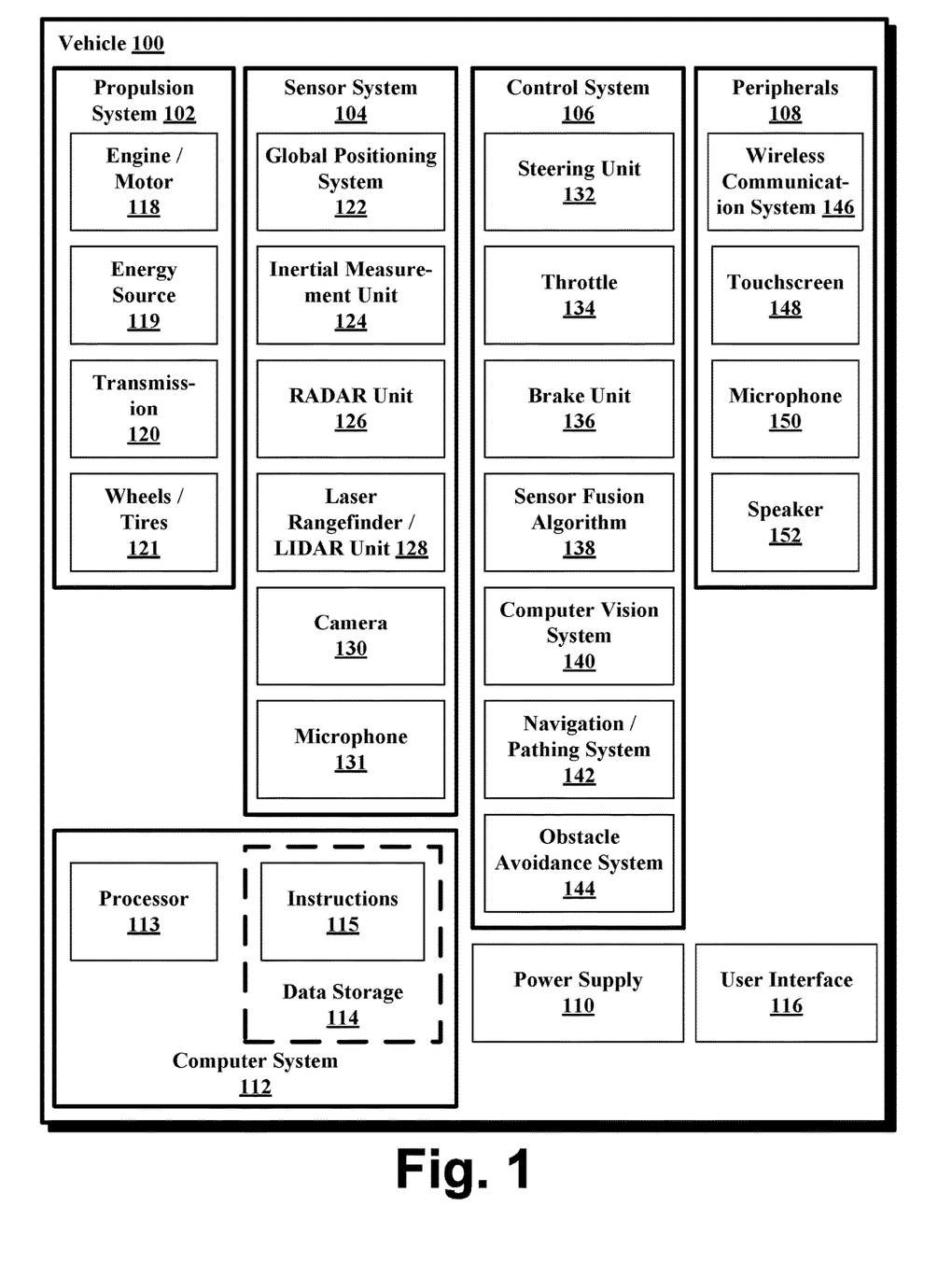
FIG. 1 is a functional block diagram illustrating a vehicle, in accordance with an example embodiment.

FIG. 1 is a functional block diagram depicting a vehicle 100 according to an example embodiment. The vehicle 100 is configured to operate fully or partially in an autonomous mode, and thus may be referred to as an "autonomous vehicle." For example, a computer system 112 may control the vehicle 100 while in an autonomous mode via control instructions to a control system 106 for the vehicle 100. The computer system 112 may receive information from a sensor system 104, and base one or more control processes (such as the setting a heading so as to avoid a detected obstacle) upon the received information in an automated fashion.

The vehicle 100 may be fully autonomous or partially autonomous. In a partially autonomous vehicle some functions can optionally be manually controlled (e.g., by a driver) some or all of the time. Further, a partially autonomous vehicle may be configured to switch between a fully-manual operation mode and a partially-autonomous and/or a fully-autonomous operation mode.

The vehicle 100 may include various subsystems such as a propulsion system 102, a sensor system 104, a control system 106, one or more peripherals 108, as well as a power supply 110, a computer system 112, and a user interface 116. The vehicle 100 may include more or fewer subsystems and each subsystem may include multiple elements. Further, each of the subsystems and elements of vehicle 100 may be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion to the vehicle 100. Depending upon the embodiment, the propulsion system 102 may include an engine/motor 118, an energy source 119, a transmission 120, and wheels/tires 121. The engine/motor 118 could be any combination of an internal combustion engine, an electric motor, steam engine, Stirling engine, or other types of engines and/or motors. In some embodiments, the propulsion system 102 may include multiple types of engines and/or motors. For instance, a gas-electric hybrid vehicle may include a gasoline engine and an electric motor. Other examples are possible as well.

The energy source 119 may represent a source of energy that may, in full or in part, power the engine/motor 118. That is, the engine/motor 118 may be configured to convert the energy source 119 into mechanical energy to operate the transmission 120. Examples of energy sources 119 may include gasoline, diesel, other petroleum-based fuels, propane, other compressed gas-based fuels, ethanol, solar panels, batteries, capacitors, flywheels, regenerative braking systems, and/or other sources of electrical power, etc. The energy source 119 may also provide energy for other systems of the automobile 100.

The transmission 120 may include elements that are operable to transmit mechanical power from the engine/motor 118 to the wheels/tires 121. Such elements may include a gearbox, a clutch, a differential, a drive shaft, and/or axle(s), etc. The transmission 120 may include other elements as well. The drive shafts may include one or more axles that may be coupled to the one or more wheels/tires 121.

The wheels/tires 121 may be arranged to stably support the vehicle 100 while providing frictional traction with a surface, such as a road, upon which the vehicle 100 moves. Accordingly, the wheels/tires 121 of vehicle 100 may be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 may represent at least one wheel that is fixedly attached to the transmission 120 and at least one tire coupled to a rim of the wheel that could make contact with the driving surface. The wheels/tires 121 may include any combination of metal and rubber, or another combination of materials.

The sensor system 104 generally includes one or more sensors configured to detect information about the environment surrounding the vehicle 100. For example, the sensor system 104 may include a Global Positioning System (GPS) 122, an inertial measurement unit (IMU) 124, a RADAR unit 126, a laser rangefinder/LIDAR unit 128, a camera 130, and/or a microphone 131. The sensor system 104 may also include sensors configured to monitor internal systems of the vehicle 100 (e.g., $O_2$ monitor, fuel gauge, engine oil temperature, wheel speed sensors, etc.). One or more of the sensors included in the sensor system 104 may be configured to be actuated separately and/or collectively in order to modify a position and/or an orientation of the one or more sensors.

The GPS 122 may be any sensor configured to estimate a geographic location of the vehicle 100. To this end, GPS 122 may include a transceiver operable to provide information regarding the position of the vehicle 100 with respect to the Earth.

The IMU 124 may include any combination of sensors (e.g., accelerometers and gyroscopes) configured to sense position and orientation changes of the vehicle 100 based on inertial acceleration.

The RADAR unit 126 may represent a system that utilizes radio signals to sense objects within the local environment of the vehicle 100. In some embodiments, in addition to sensing the objects, the RADAR unit 126 may additionally be configured to sense the speed and/or heading of the objects.

Similarly, the laser rangefinder or LIDAR unit 128 may be any sensor configured to sense objects in the environment in which the vehicle 100 is located using lasers. Depending upon the embodiment, the laser rangefinder/LIDAR unit 128 could include one or more laser sources, a laser scanner, and one or more detectors, among other system components. The laser rangefinder/LIDAR unit 128 could be configured to operate in a coherent (e.g., using heterodyne detection) or an incoherent detection mode.

The camera 130 may include one or more devices configured to capture a plurality of images of the environment surrounding the vehicle 100. The camera 130 may be a still camera or a video camera. In some embodiments, the camera 130 may be mechanically movable such as by rotating and/or tilting a platform to which the camera is mounted. As such, a control process of the vehicle 100 may be implemented to control the movement of the camera 130.

The sensor system 104 may also include a microphone 131. The microphone 131 may be configured to capture sound from the environment surrounding the vehicle 100. In some cases, multiple microphones can be arranged as a microphone array, or possibly as multiple microphone arrays.

The control system 106 may be configured to control operation(s) of the vehicle 100 and its components. Accordingly, the control system 106 may include various elements include steering unit 132, throttle 134, brake unit 136, a sensor fusion algorithm 138, a computer vision system 140, a navigation/pathing system 142, and an obstacle avoidance system 144, etc.

The steering unit 132 may represent any combination of mechanisms that may be operable to adjust the heading of vehicle 100. For example, the steering unit 132 can adjust the axis (or axes) of one or more of the wheels/tires 121 so as to effect turning of the vehicle 100. The throttle 134 may be configured to control, for instance, the operating speed of the engine/motor 118 and, in turn, control the speed of the vehicle 100. The brake unit 136 may include any combination of mechanisms configured to decelerate the vehicle 100. The brake unit 136 may, for example, use friction to slow the wheels/tires 121. In other embodiments, the brake unit 136 inductively decelerates the wheels/tires 121 by a regenerative braking process to convert kinetic energy of the wheels/tires 121 to electric current. The brake unit 136 may take other forms as well.

The sensor fusion algorithm 138 may be an algorithm (or a computer program product storing an algorithm) configured to accept data from the sensor system 104 as an input. The data may include, for example, data representing information sensed at the sensors of the sensor system 104. The sensor fusion algorithm 138 may include, for instance, a Kalman filter, Bayesian network, or other algorithm. The sensor fusion algorithm 138 may provide various assessments based on the data from sensor system 104. Depending upon the embodiment, the assessments may include evaluations of individual objects and/or features in the environment of vehicle 100, evaluations of particular situations, and/or evaluations of possible impacts based on the particular situation. Other assessments are possible.

The computer vision system 140 may be any system operable to process and analyze images captured by camera 130 in order to identify objects and/or features in the environment of vehicle 100 that could include traffic signals, road way boundaries, other vehicles, pedestrians, and/or obstacles, etc. The computer vision system 140 may use an object recognition algorithm, a Structure From Motion (SFM) algorithm, video tracking, and other computer vision techniques. In some embodiments, the computer vision system 140 could be additionally configured to map an environment, track objects, estimate the speed of objects, etc.

The navigation and pathing system 142 may be any system configured to determine a driving path for the vehicle 100. For example, the navigation/pathing system 142 may determine a series of speeds and directional headings to effect movement of the vehicle 100 along a path that substantially avoids perceived obstacles while generally advancing the vehicle 100 along a roadway-based path leading to an ultimate destination, which may be set according to user inputs via the user interface 116, for example. The navigation and pathing system 142 may additionally be configured to update the driving path dynamically while the vehicle 100 is in operation. In some embodiments, the navigation and pathing system 142 could be configured to incorporate data from the sensor fusion algorithm 138, the GPS 122, and one or more predetermined maps so as to determine the driving path for vehicle 100.

The obstacle avoidance system 144 may represent a control system configured to identify, evaluate, and avoid or otherwise negotiate potential obstacles in the environment of the vehicle 100. For example, the obstacle avoidance system 144 may effect changes in the navigation of the vehicle 100 by operating one or more subsystems in the control system 106 to undertake swerving maneuvers, turning maneuvers, braking maneuvers, etc. In some embodiments, the obstacle avoidance system 144 is configured to automatically determine feasible ("available") obstacle avoidance maneuvers on the basis of surrounding traffic patterns, road conditions, etc. For example, the obstacle avoidance system 144 may be configured such that a swerving maneuver is not undertaken when other sensor systems detect vehicles, construction barriers, other obstacles, etc. in the region adjacent the vehicle 100 that would be swerved into. In some embodiments, the obstacle avoidance system 144 may automatically select the maneuver that is both available and maximizes safety of occupants of the vehicle. For example, the obstacle avoidance system 144 may select an avoidance maneuver predicted to cause the least amount of acceleration in a passenger cabin of the vehicle 100.

The control system 106 may additionally or alternatively include components other than those shown and described.

The vehicle 100 also includes peripherals 108 configured to allow interaction between the vehicle 100 and external sensors, other vehicles, other computer systems, and/or a user, such as an occupant of the vehicle 100. For example, the peripherals 108 for receiving information from occupants, external systems, etc. may include a wireless communication system 146, a touchscreen 148, a microphone 150, and/or a speaker 152.

In some embodiments, the peripherals 108 function to receive inputs for a user of the vehicle 100 to interact with the user interface 116. To this end, the touchscreen 148 can both provide information to a user of the vehicle 100, and convey information from the user indicated via the touchscreen 148 to the user interface 116. The touchscreen 148 can be configured to sense both touch positions and touch gestures from the finger of a user (or stylus, etc.) via capacitive sensing, resistance sensing, optical sensing, a surface acoustic wave process, etc. The touchscreen 148 can be capable of sensing finger movement in a direction parallel or planar to the touchscreen surface, in a direction normal to the touchscreen surface, or both, and may also be capable of sensing a level of pressure applied to the touchscreen surface. An occupant of the vehicle 100 can also utilize a voice command interface. For example, the microphone 150 can be configured to receive audio (e.g., a voice command or other audio input) from an occupant of the vehicle 100. Similarly, the speaker 152 can be configured to output audio to the occupant of the vehicle 100.

In some embodiments, the peripherals 108 function to allow communication between the vehicle 100 and external systems, such as devices, sensors, other vehicles, etc. within its surrounding environment and/or controllers, servers, etc., physically located far from the vehicle 100 that provide useful information regarding the vehicle's surroundings, such as traffic information, weather information, etc. For example, the wireless communication system 146 can wirelessly communicate with one or more devices directly or via a communication network. The wireless communication system 146 can optionally use 3G cellular communication, such as CDMA, EVDO, GSM/GPRS, and/or 4G cellular communication, such as WiMAX or LTE.

Additionally or alternatively, the wireless communication system 146 can communicate with a wireless local area network (WLAN), for example, using WiFi. In some embodiments, the wireless communication system 146 could communicate directly with a device, for example, using an infrared link, Bluetooth, and/or ZigBee. The wireless communication system 146 can include one or more dedicated short range communication (DSRC) devices that can include public and/or private data communications between vehicles and/or roadside stations. Other wireless protocols for sending and receiving information embedded in signals, such as various vehicular communication systems, can also be employed by the wireless communication system 146 within the context of the present disclosure.

The power supply 110 may provide power to components of the vehicle 100, such as electronics in the peripherals 108, the computer system 112, the sensor system 104, etc. The power supply 110 can include a rechargeable lithium-ion or lead-acid battery for storing and discharging electrical energy to the various powered components, for example. In some embodiments, one or more banks of batteries may be configured to provide electrical power. In some embodiments, the power supply 110 and the energy source 119 can be implemented together, as in some all-electric cars.

Many or all of the functions of the vehicle 100 may be controlled via the computer system 112 that receives inputs from the sensor system 104, the peripherals 108, etc., and communicates appropriate control signals to the propulsion system 102, the control system 106, the peripherals 108, etc. to effect automatic operation of the vehicle 100 based on its surroundings. The computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various automobile functions, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 at during the operation of the vehicle 100 in the autonomous, semi-autonomous, and/or manual modes.

The vehicle 100, and associated computer system 112, provides information to and/or receives input from, a user of the vehicle 100, such as an occupant in a passenger cabin of the vehicle 100. Accordingly, the vehicle 100 may include a user interface 116 for providing information to or receiving input from a user of vehicle 100. The user interface 116 may control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 controls the operation of the vehicle 100 based on inputs received from various subsystems indicating vehicle and/or environmental conditions (e.g., propulsion system 102, sensor system 104, and/or control system 106), as well as inputs from the user interface 116, indicating user preferences. For example, the computer system 112 may utilize input from the control system 106 to control the steering unit 132 to avoid an obstacle detected by the sensor system 104 and the obstacle avoidance system 144. The computer system 112 may be configured to control many aspects of the vehicle 100 and its subsystems. Generally, however, provisions are made for manually overriding automated controller-driven operation, such as in the event of an emergency, or merely in response to a user-activated override, etc.

The components of the vehicle 100 described herein may be configured to work in an interconnected fashion with other components within or outside their respective systems. For example, the camera 130 can capture a plurality of images that represent information about an environment of the vehicle 100 while operating in an autonomous mode. The environment may include other vehicles, traffic lights, traffic signs, road markers, pedestrians, etc. The computer vision system 140 can categorize and/or recognize various aspects in the environment in concert with the sensor fusion algorithm 138, the computer system 112, etc. based on object recognition models pre-stored in the data storage 114, and/or by other techniques.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 may generally be communicatively coupled together in a wired and/or wireless fashion.

Figure 2:
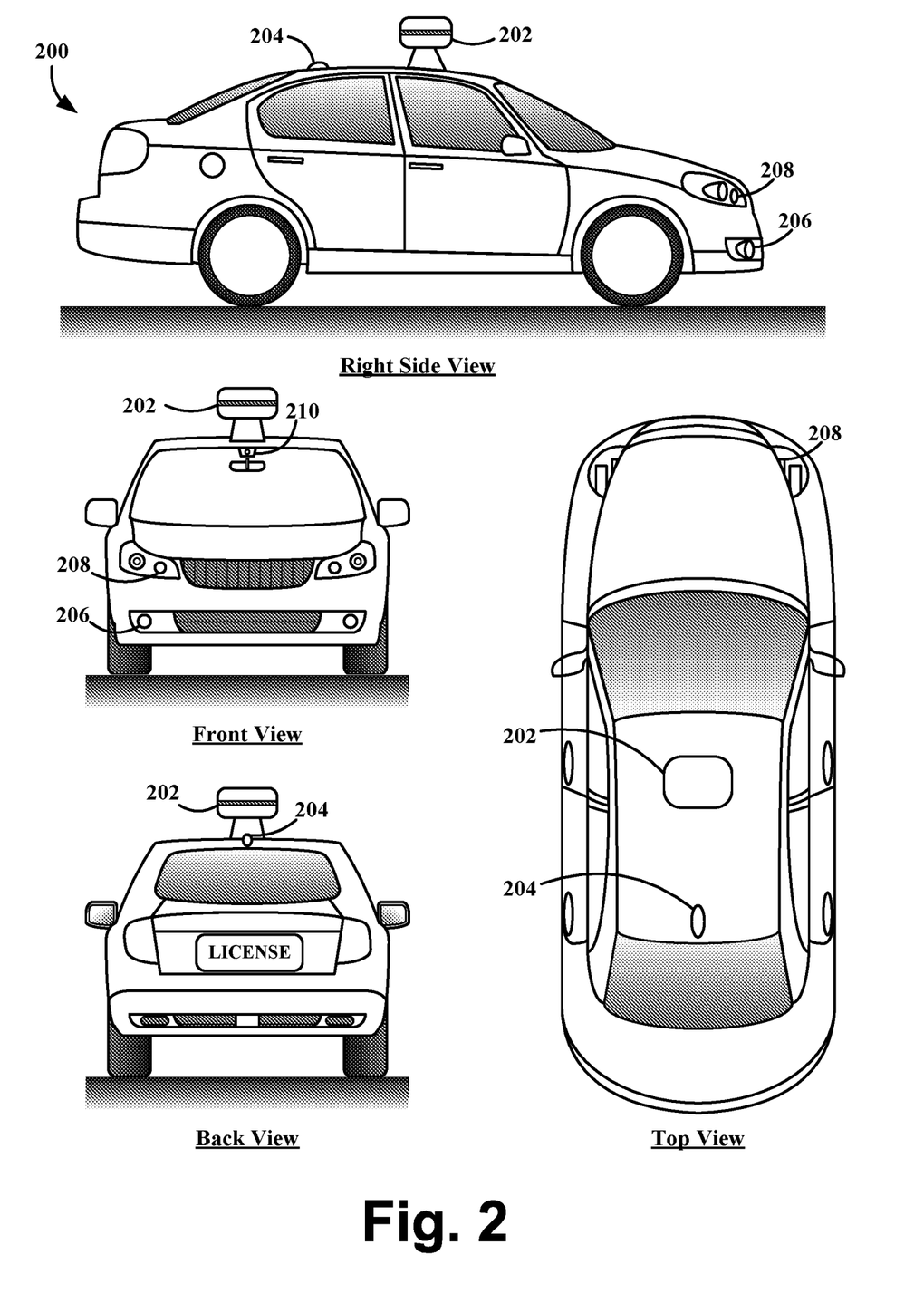
FIG. 2 is a vehicle, in accordance with an example embodiment.

FIG. 2 depicts an example vehicle 200 that can include all or most of the functions described in connection with the vehicle 100 in reference to FIG. 1. Although example vehicle 200 is illustrated in FIG. 2 as a four-wheel sedan-type car for illustrative purposes, the present disclosure is not so limited. For instance, example vehicle 200 can represent any type of vehicle mentioned herein.

Example vehicle 200 includes a sensor unit 202, a wireless communication system 204, a LIDAR unit 206, a laser rangefinder unit 208, and a camera 210. Furthermore, example vehicle 200 may include any of the components described in connection with vehicle 100 of FIG. 1.

The sensor unit 202 is mounted atop example vehicle 200 and includes one or more sensors configured to detect information about an environment surrounding example vehicle 200, and output indications of the information. For example, the sensor unit 202 may include any combination of cameras, RADARs, LIDARs, range finders, and acoustic sensors. The sensor unit 202 may include one or more movable mounts that may be operable to adjust the orientation of one or more sensors in the sensor unit 202. In one embodiment, the movable mount may include a rotating platform that may scan sensors so as to obtain information from each direction around example vehicle 200. In another embodiment, the movable mount of the sensor unit 202 may be moveable in a scanning fashion within a particular range of angles and/or azimuths. The sensor unit 202 may be mounted atop the roof of a car, for instance, however other mounting locations are possible. Additionally, the sensors of the sensor unit 202 may be distributed in different locations and need not be collocated in a single location. Some possible sensor types and mounting locations include the LIDAR unit 206 and laser rangefinder unit 208. Furthermore, each sensor of the sensor unit 202 may be configured to be moved or scanned independently of other sensors of the sensor unit 202.

The wireless communication system 204 may be located on a roof of example vehicle 200 as depicted in FIG. 2. Alternatively, the wireless communication system 204 may be located, fully or in part, elsewhere. The wireless communication system 204 may include wireless transmitters and receivers that may be configured to communicate with devices external or internal to example vehicle 200. Specifically, the wireless communication system 204 may include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 may be a photo-sensitive instrument, such as a still camera, a video camera, etc., that is configured to capture a plurality of images of the environment of example vehicle 200. To this end, the camera 210 can be configured to detect visible light, and can additionally or alternatively be configured to detect light from other portions of the spectrum, such as infrared or ultraviolet light. The camera 210 can be a two-dimensional detector, and can optionally have a three-dimensional spatial range of sensitivity. In some embodiments, the camera 210 can include, for example, a range detector configured to generate a two-dimensional image indicating distance from the camera 210 to a number of points in the environment. To this end, the camera 210 may use one or more range detecting techniques.

For example, the camera 210 may provide range information by using a structured light technique in which example vehicle 200 illuminates an object in the environment with a predetermined light pattern, such as a grid or checkerboard pattern and uses the camera 210 to detect a reflection of the predetermined light pattern from environmental surroundings. Based on distortions in the reflected light pattern, example vehicle 200 may determine the distance to the points on the object. The predetermined light pattern may comprise infrared light, or radiation at other suitable wavelengths for such measurements.

The camera 210 may be mounted inside a front windshield of example vehicle 200. Specifically, the camera 210 may be situated to capture images from a forward-looking view with respect to the orientation of example vehicle 200. Other mounting locations and viewing angles of the camera 210 may also be used, either inside or outside example vehicle 200.

The camera 210 can have associated optics operable to provide an adjustable field of view. Further, the camera 210 may be mounted to example vehicle 200 with a movable mount to vary a pointing angle of the camera 210, such as a via a pan/tilt mechanism.

Figure 3:
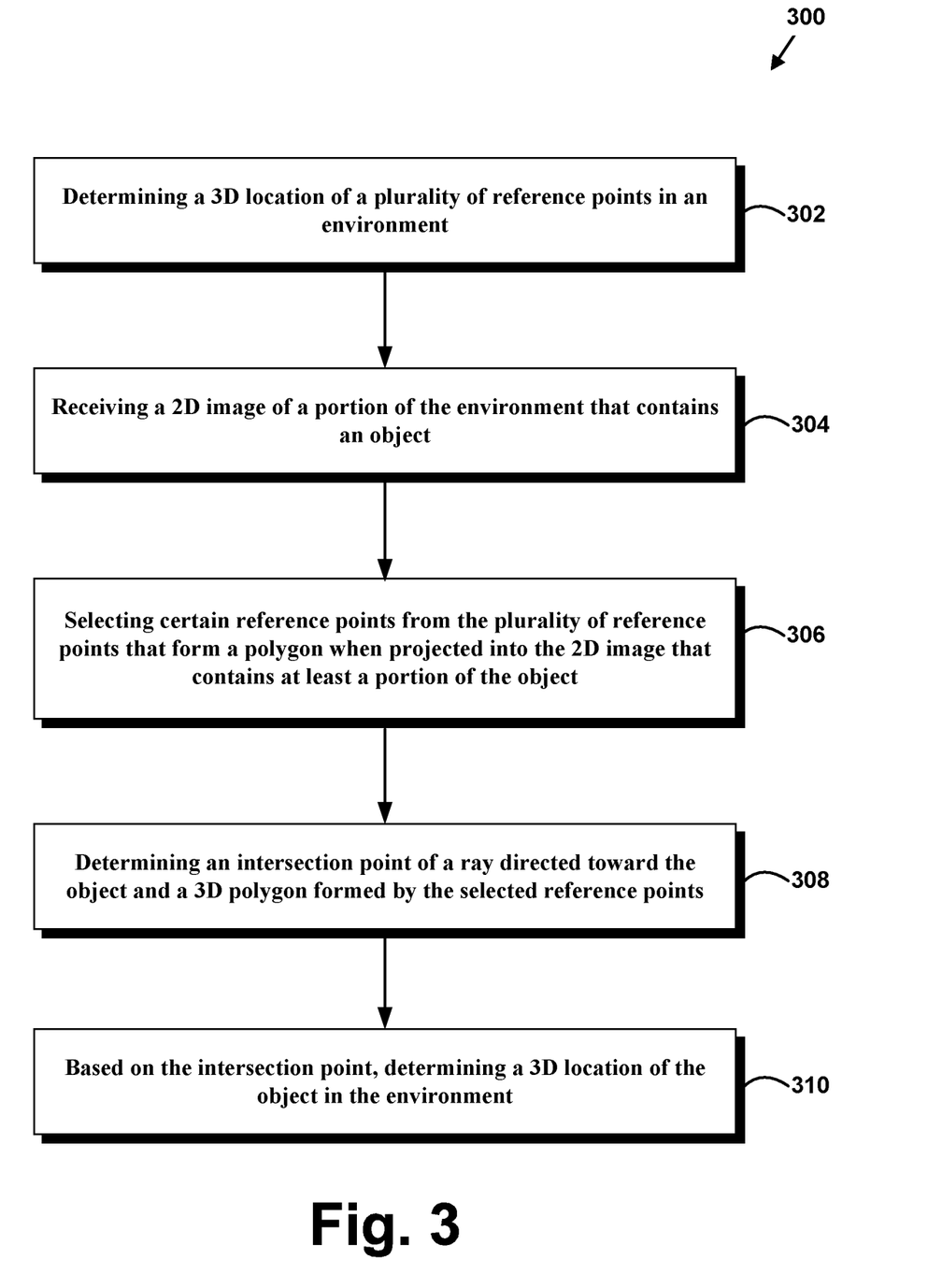
FIG. 3 illustrates a block diagram of a method, in accordance with an example embodiment.

In FIG. 3, a method 300 is provided for using location information about certain points in an environment to facilitate determining the location of objects within the environment. In some examples, method 300 may be carried out by a vehicle such as vehicle 100 and/or vehicle 200 as illustrated and described in reference to FIGS. 1 and 2, respectively. For example, the processes described herein may be carried out by camera 130 mounted to an autonomous vehicle (e.g., vehicle 200) in communication with computer system 112, sensor fusion algorithm 138, and/or computer vision system 140.

It should be understood that while method 300 is described here as being carried out by a computing system of an autonomous vehicle or a server system in contact with such a vehicle, the method could also be used in a number of different applications that may benefit from being able to quickly determine the location of objects in an environment. For instance, method 300 could be used by a different type of a vehicle, a real-time mapping service, a GPS system, or other type of driver assistance system. Other possibilities exist as well.

Furthermore, it is noted that the functionality described in connection with the flowcharts described herein can be implemented as special-function and/or configured general-function hardware modules, portions of program code executed by a processor (e.g., the processor 113 in the computer system 112) for achieving specific logical functions, determinations, and/or steps described in connection with the flowchart shown in FIG. 3. Where used, program code can be stored on any type of computer-readable medium (e.g., computer-readable storage medium or non-transitory media, such as the data storage 114 described above with respect to computer system 112 and/or a computer program product 500 described below), for example, such as a storage device including a disk or hard drive.

In addition, each block of the flowchart shown in FIG. 3 may represent circuitry that is wired to perform the specific logical functions in the process. Unless specifically indicated, functions in the flowchart shown in FIG. 3 may be executed out of order from that shown or discussed, including substantially concurrent execution of separately described functions, or even in reverse order in some examples, depending on the functionality involved, so long as the overall functionality of the described method is maintained.

Figure 4A:
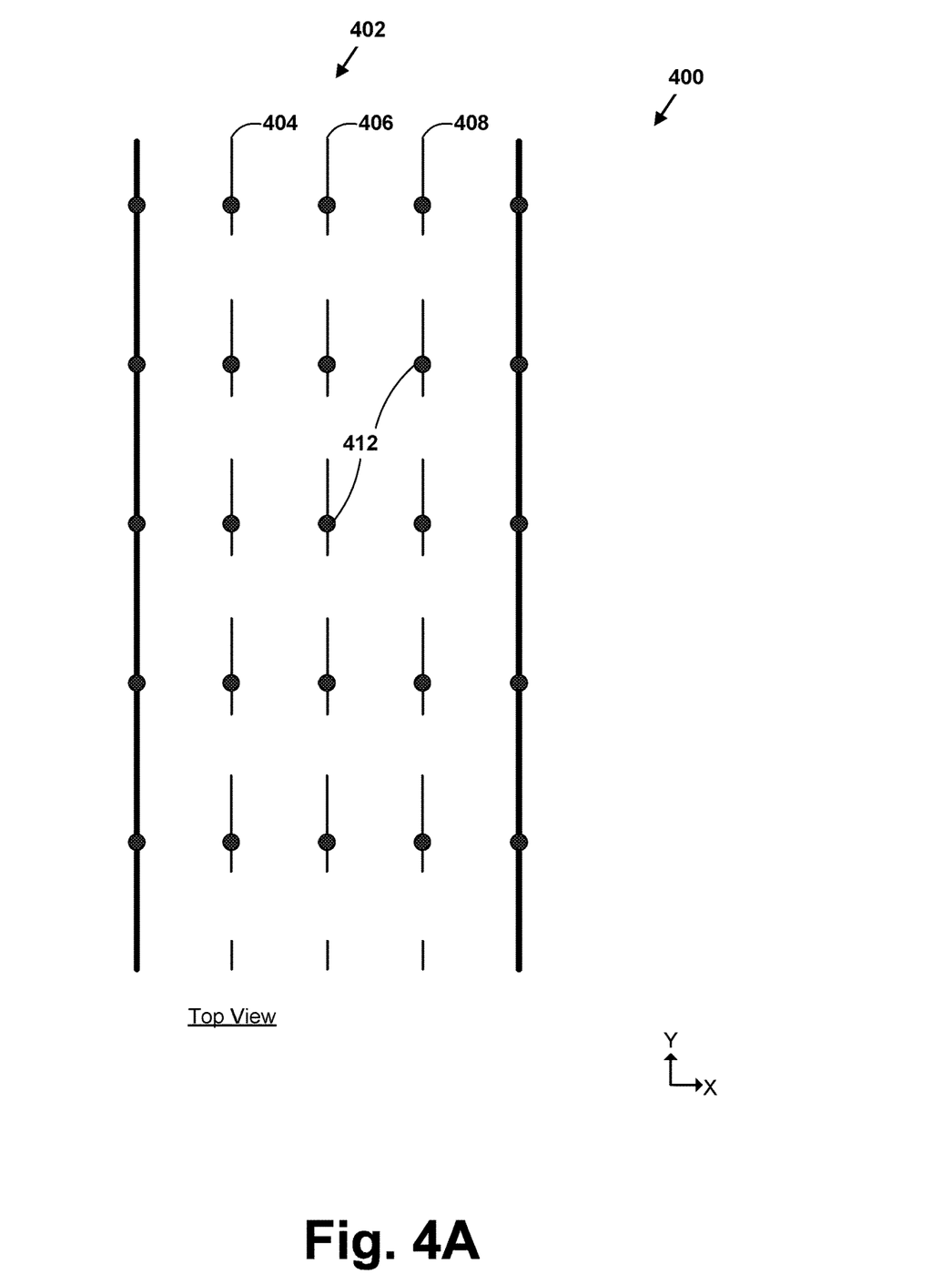
FIG. 4A is a top view of reference points in an environment, in accordance with an example embodiment.

Initially at block 302, method 300 of FIG. 3 includes determining a 3D location of a plurality of reference points in an environment. In an example embodiment, some of the reference points may be points on a road or other route of travel. FIG. 4A is a top view of reference points in an environment 400, in accordance with an example embodiment. As shown in FIG. 4A, the reference points 412 may be points located at equally spaced intervals along a road 402. In additional examples, some of the reference points 412 may be located along lane boundaries 404, 406, 408 of the road 402. In further examples, several rows of reference points may each be located at equally spaced intervals along one of the lane boundaries 404, 406, 408 of the road 402. The reference points may be distributed in other ways along a road or in different locations as well.

In further examples, the 3D location of one or more continuous curves of points in an environment may be stored. The 3D location of some of the reference points may then be determined by sampling points from one or more of the continuous curves. For instance, the continuous curves may store the 3D location of lane boundaries on roads within an environment. Reference points may then be determined by selecting points at intervals along one or more of the curves. By using continuous curves, different intervals between reference points may be used depending on the desired level of accuracy for a particular application.

In additional examples, the reference points may include other points in the environment, such as points on signs, buildings, bridges, or any other permanent structures in the environment. These reference points may be sampled from continuous curves, sampled from other functions, or stored individually. By determining the location of additional points including points at a variety of different positions and/or altitudes, locations of objects within the environment may be determined more precisely.

Block 304 of method 300 of FIG. 3 includes receiving a 2D image of a portion of the environment, where the image contains an object. For instance, the image may be received from a camera of a vehicle such as an autonomous vehicle. The vehicle may be the vehicle described in reference to FIGS. 1 and 2 and may be configured to operate in an autonomous mode in the environment. The environment may be any environment in which the vehicle may operate autonomously. Such environments may include a highway, a road, or an interstate to name a few.

Figure 4B:
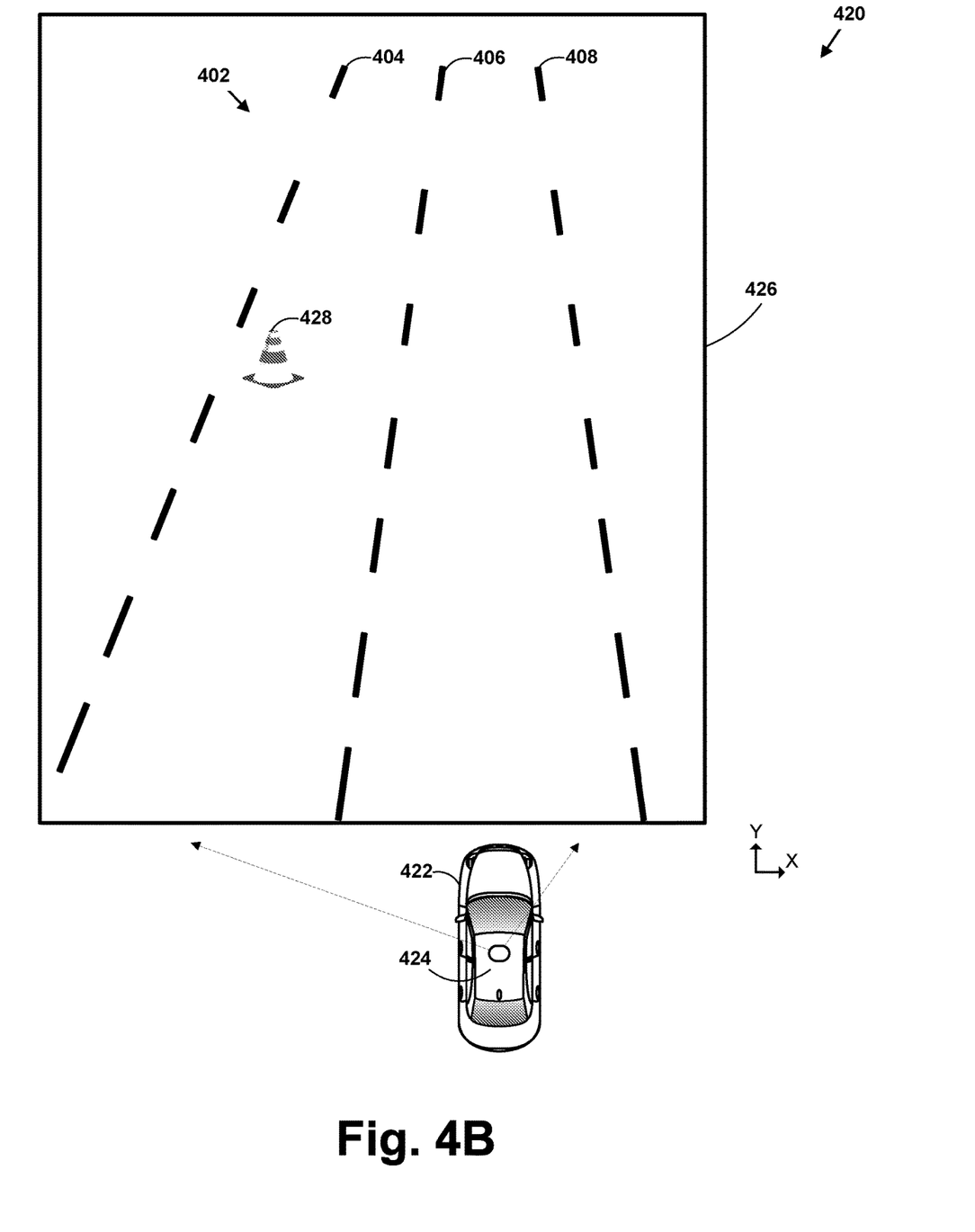
FIG. 4B is a schematic illustration of an example image of an object within the environment obtained by an autonomous vehicle, in accordance with an example embodiment.

In one example, referring to FIG. 4B, a 2D image 426 may be captured by a vehicle 422. For example, vehicle 422 may operate at least one sensor of sensor unit 424, such as a monocular camera, similar to or the same as camera 130, to receive an image 426 of a portion of the environment 400 in which the vehicle 422 is operating. The image 426 may include part of a road 402 with lane boundaries 404, 406, 408. The image 426 may additionally contain an object 428 (in this case, a cone) that is located within the environment 420. While the object 428 is shown as a cone here, it should be understood that any physical thing could be the object, such as a flare, an obstacle in the road, another car, a pedestrian, and so on.

Note that in FIG. 4B the image 426 captured, for example, by a camera of sensor unit 424 of vehicle 422, is the image shown above the dotted arrows and does not include vehicle 422. Vehicle 422 is shown for explanation purposes in this example, and is not intended to be part of the image 426. In practice, the image 426 may be obtained in front of, behind, or any degree in-between, from the vehicle 422 and thus may not include an image of the vehicle itself. In some examples, a portion of vehicle 422 may be included within the image 426 as well.

The image 426 may comprise a digital photograph or a digital graphic that is representative of a portion of environment 400. The image 426 may include any data format capable of organizing and storing a photographic image and/or graphic image as a digital file, may encompass various types of data, may be of various file formats, and may be stored to various mediums, whether those types of data, file formats, and mediums are known or have yet to be developed.

Block 306 of method 300 includes selecting certain reference points from the plurality of reference points that form a polygon, such as a triangle, when projected into the 2D image. The reference points may be selected so that the polygon contains at least a portion of the object within the 2D image.

Figure 4C:
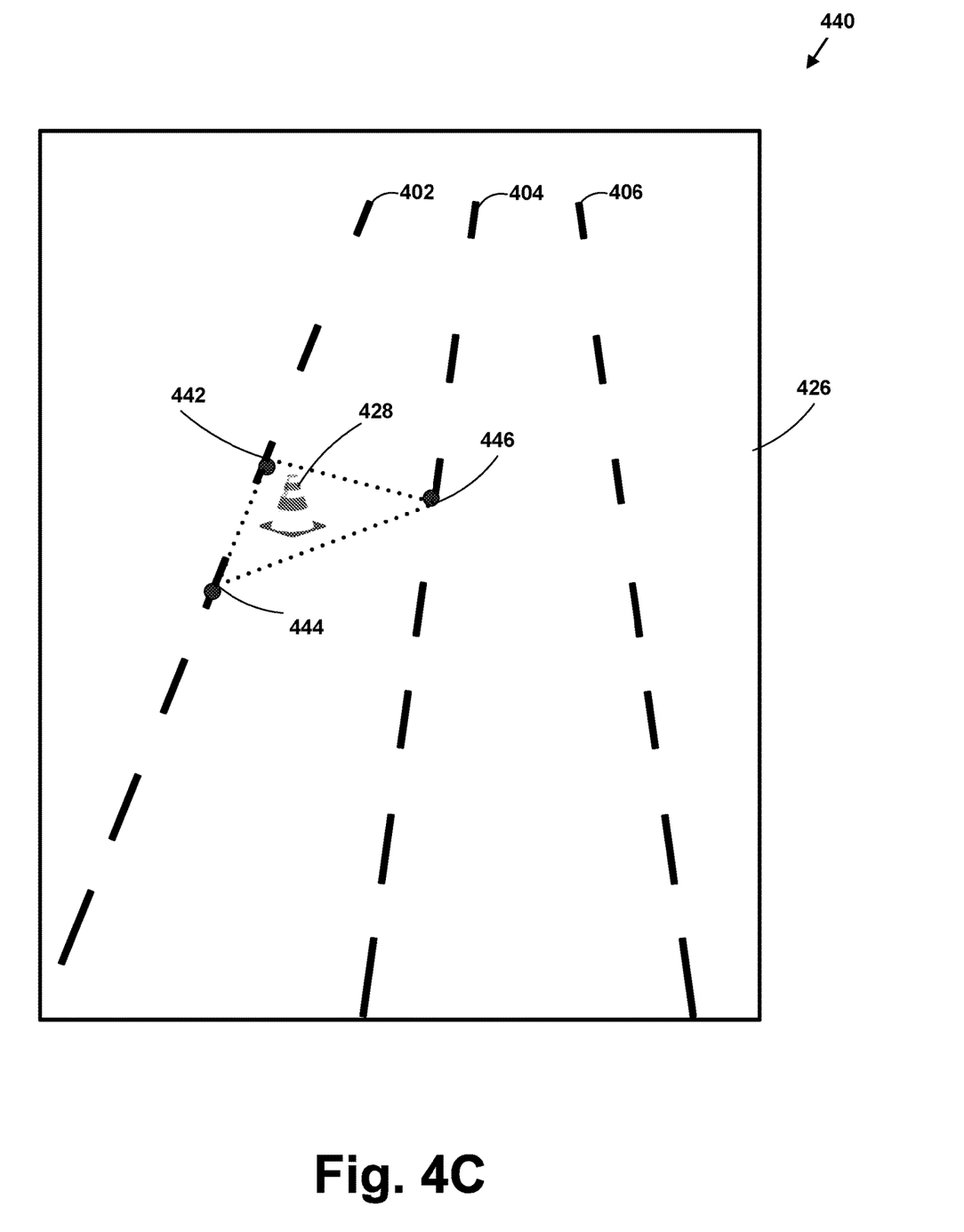
FIG. 4C is a schematic illustration of reference points from FIG. 4A chosen to form a polygon that surrounds the object from the image in FIG. 4B, in accordance with an example embodiment.

FIG. 4C is a schematic illustration of reference points chosen to form a polygon that surrounds an object within an image, in accordance with an example embodiment. A 2D image 426 of a portion of an environment 400 may first be captured as described above. For example, the image 426 may be captured by a camera system of an autonomous vehicle. Some of the reference points may then be projected into the image. The location and direction of the camera may be used to determine where a reference point is located within the 2D image based on the 3D coordinates of the reference point. For example, the 3D coordinates of several reference points may be transformed into the 2D coordinates of the reference points within the image.

As shown in FIG. 4C, certain reference points 442, 444, 446 may be chosen from reference points within the environment located near the location where the image was taken such that the chosen reference points form a polygon when projected into the image 426 that surrounds the object 428. One or more 2D point-in-polygon tests may be used to determine a polygon that surrounds the object. One of a number of different 2D point-in-polygon testing algorithms may be used, such as a ray casting algorithm, a crossing number algorithm, or a winding number algorithm. The polygon could be a triangle as shown here, a quadrilateral, or some other shape. If a triangle is used, a 2D point-in-triangle testing algorithm may be used.

In some examples, reference points may be considered as points for polygons based on their distance from the object within the image. For instance, points closest to the object within the 2D image may be considered first, and points further away from the object may then be considered sequentially until an appropriate polygon is found. In further examples, the smallest polygon that can be formed by reference points which surrounds the object may be determined. A smaller polygon may provide a more accurate estimate of the object's position in 3D space. Other methods for determining a polygon that surrounds the object may be used as well.

In some examples, an object may be too large to determine a polygon of reference points that surrounds the object within the image. In such examples, reference points may be selected such that they form a polygon which surrounds a particular portion or portions of the object. For example, in order to determine the location of another car on the road, reference points may be chosen such that they form a polygon surrounding one or more of the car's tires. In an additional example, a center pixel of the object may first be determined, for example by average together all of the pixels of the object within the image. Reference points may then be chosen such that they form a polygon which surrounds the center pixel. Other methods of determining a portion of an object to surround with a polygon exist as well.

Block 308 of method 300 includes determining an intersection point of a ray directed toward the object and a 3D polygon formed by the selected reference points. A ray through space from the point where the image was taken (i.e., the camera on the vehicle) toward the object may be determined using known directional information about the camera. In some examples, the ray may be a ray directed to a center pixel of the object. Then, an algorithm can be used to determine an intersection of the ray toward the object and a 3D polygon formed by the selected reference points within the environment. In some examples, this intersection point can be determined by first determining a plane that contains the 3D polygon. Then, a ray-plane intersection algorithm may be used to find the intersection point. The algorithm could be one of a number of different classical ray-plane intersection algorithms, such as the Möller-Trumbore algorithm, the Schlick-Subrenat algorithm, or a different algebraic or geometric algorithm.

Block 310 of method 300 includes determining a 3D location of the object within the environment based on the intersection point of the ray toward the object and the 3D polygon of selected reference points. The intersection point may be an estimation of the 3D coordinates of the object within the environment. Additionally, a distance to the object from the vehicle or from any other known location within the environment may then be computed using the estimated 3D coordinates of the object.

Figure 4D:
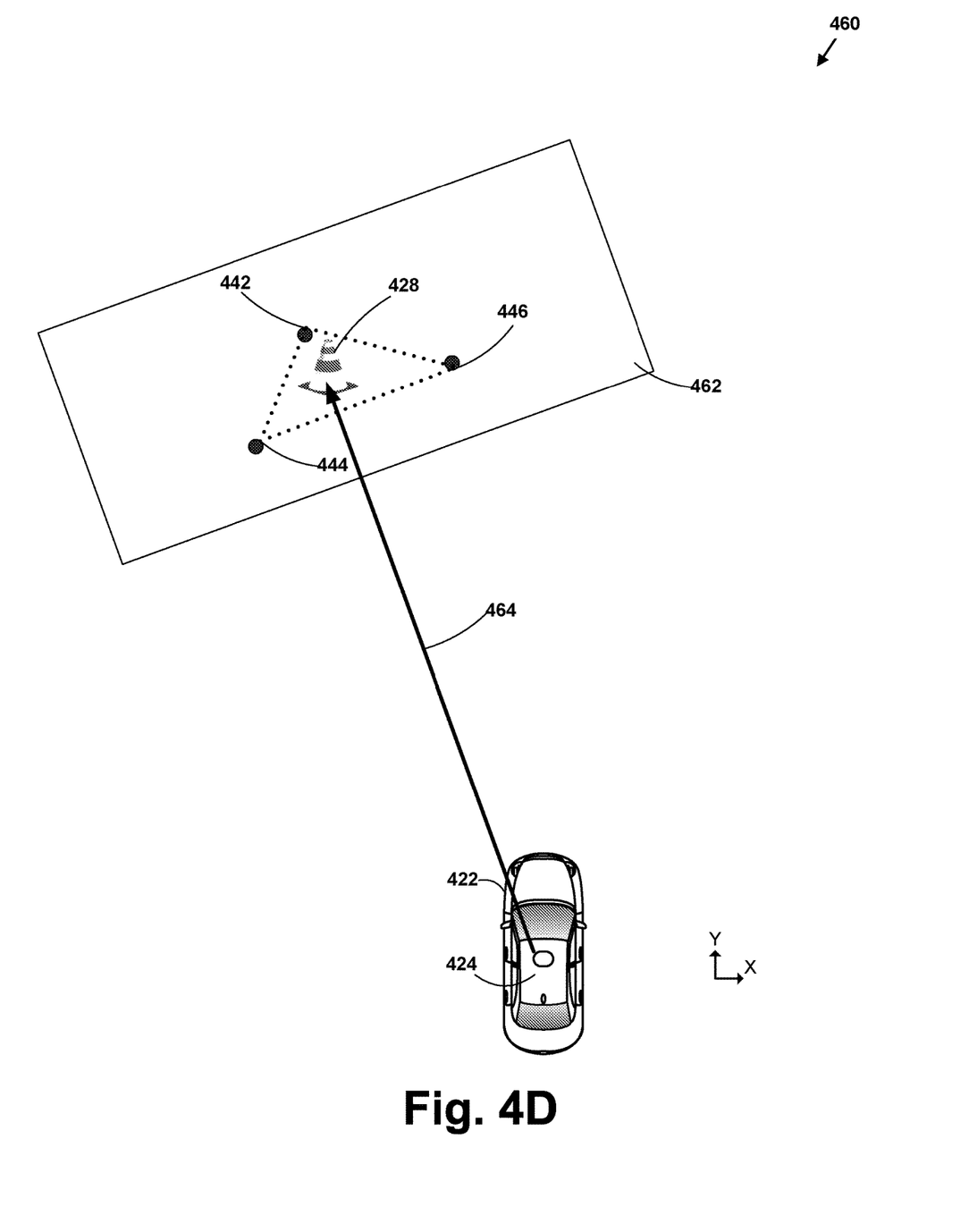
FIG. 4D is a schematic illustration of determining the location of the object from the image in FIG. 4B using the polygon from FIG. 4C, according to an example embodiment.

FIG. 4D shows an example of determining a 3D location of an object using ray-plane intersection with a plane formed by certain reference points within an environment. As described above, reference points 442, 444, 446 may first be selected that form a polygon when projected into a 2D image that surrounds an object 428. A plane 462 may then be determined such that the plane contains the reference points 442, 444, 446. For instance, the plane 462 may be determined by computing a cross product of two non-parallel edges of the polygon formed by the reference points. Additionally, a ray 464 from a camera 424 located on an autonomous vehicle 422 toward the object 428 in space. Then, a ray-plane intersection algorithm may be used to compute an intersection point of the ray 464 with the plane 462. An estimation of the 3D location of the object 428 may then be determined based on the intersection point. The 3D location of the object may include a depth value such that a distance from the vehicle 422 to the object 428 may be determined.

In some examples, first determining a 2D polygon that contains the object within the image followed by a single ray-plane intersection may be computationally more efficient than doing all of the computations in 3D space. For instance, other approaches may involve computing an intersection point of a ray directed toward the object and a mesh of known 3D reference points containing many planes. However, such approaches may require multiple ray-plane intersection tests in order to determine a polygon that contains the object. Accordingly, more computation time may be needed to determine a distance to an object in space.

In additional examples, the estimated distance to one or more objects within an environment may be used in order to provide instructions to an autonomous vehicle. In some examples, only a short amount of time may be available in which to compute the distance to an object. For instance, using the speed of the vehicle as well as the distance to an object, a time until the vehicle reaches an object may be determined. The vehicle may be directed to change course or change speeds in a certain amount of time in order to avoid collision with an obstacle, for example. In such a scenario, there may not be enough time to directly compute the intersection of the ray toward the object with a mesh formed by the reference points in 3D space.

Example methods, such as method 300 of FIG. 3 may be carried out in whole or in part by the vehicle and its subsystems. Accordingly, example methods could be described by way of example herein as being implemented by the vehicle. However, it should be understood that an example method may be implemented in whole or in part by other computing devices. For example, an example method may be implemented in whole or in part by a server system, which receives data from a device such as those associated with the vehicle. Other examples of computing devices or combinations of computing devices that can implement an example method are possible.

Additionally, example methods, such as method 300, may be carried out by other types of systems as well. For instance, a mapping system, a GPS system, or other driver instructing system may use an example method to quickly determine the position of important objects or features within an environment. Other types of services may benefit from using examples methods as well.

Figure 5:
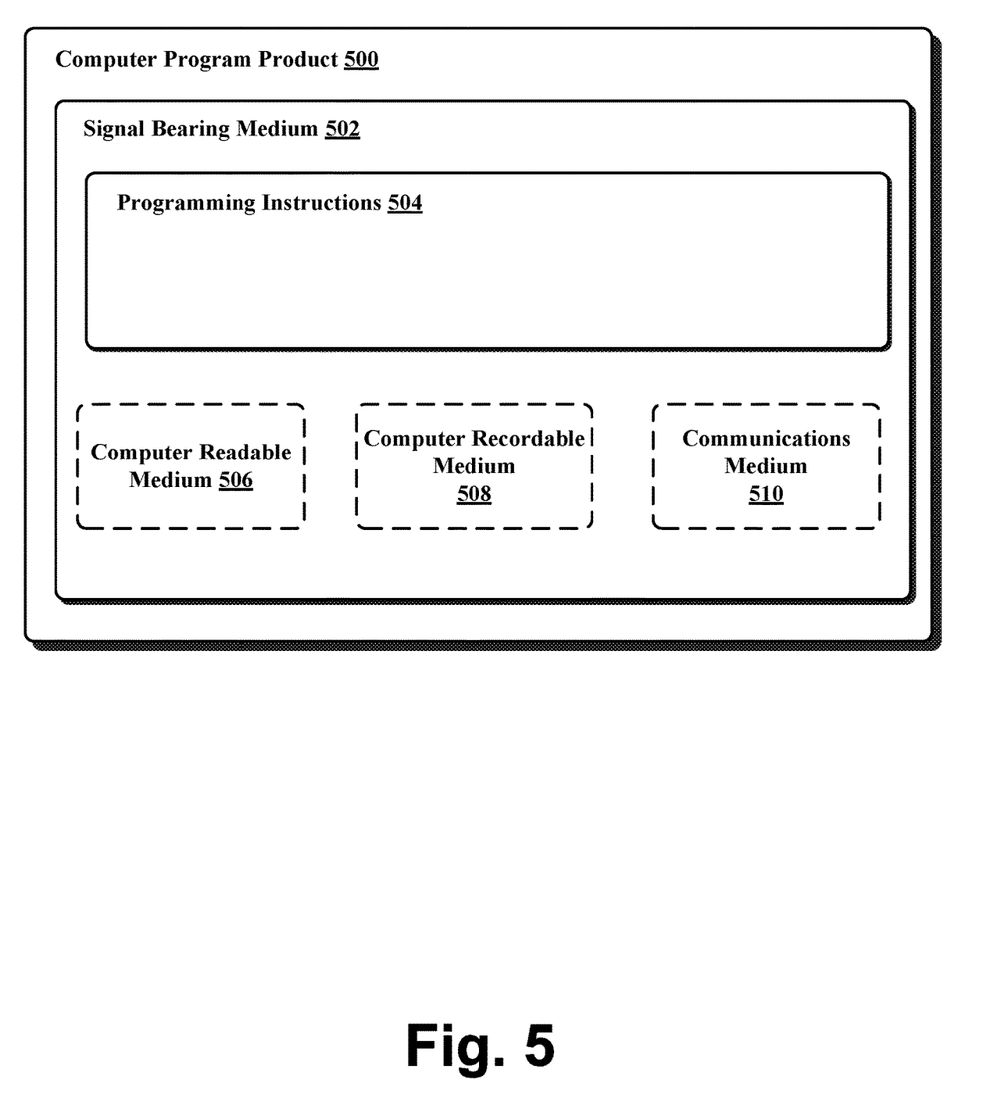
FIG. 5 is a schematic diagram of a computer program product, according to an example embodiment.

In some embodiments, the techniques disclosed herein may be implemented as computer program instructions encoded on a non-transitory computer-readable storage media in a machine-readable format, or on other non-transitory media or articles of manufacture (e.g., the instructions 115 stored on the data storage 114 of the computer system 112 of the vehicle 100). FIG. 5 is a schematic illustrating a conceptual partial view of an example computer program product that includes a computer program for executing a computer process on a computing device, arranged according to at least some embodiments presented herein.

In one embodiment, the example computer program product 500 is provided using a signal bearing medium 502. The signal bearing medium 502 may include one or more programming instructions 504 that, when executed by one or more processors may provide functionality or portions of the functionality described herein. In some examples, the signal bearing medium 502 can be a non-transitory computer-readable medium 506, such as, but not limited to, a hard disk drive, a Compact Disc (CD), a Digital Video Disk (DVD), a digital tape, memory, etc. In some implementations, the signal bearing medium 502 may encompass a computer recordable medium 508, such as, but not limited to, memory, read/write (R/W) CDs, R/W DVDs, etc. In some implementations, the signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, the signal bearing medium 502 may be conveyed by a wireless form of the communications medium 510.

The one or more programming instructions 504 may be, for example, computer executable and/or logic implemented instructions. In some examples, a computing device such as the computer system 112 of FIG. 1 may be configured to provide various operations, functions, or actions in response to the programming instructions 504 conveyed to the computer system 112 by one or more of the computer readable medium 506, the computer recordable medium 508, and/or the communications medium 510.

The non-transitory computer readable medium could also be distributed among multiple data storage elements, which could be remotely located from each other. The computing device that executes some or all of the stored instructions could be a vehicle, such as the example vehicle 200 illustrated in FIG. 2. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments are possible. The various aspects and embodiments disclosed herein are for purposes of illustration and are not intended to be limiting, with the true scope being indicated by the following claims.

We claim:

1. A computer-implemented method, comprising:
    projecting a plurality of reference points into a 2D image based on previously stored 3D locations of the plurality of reference points and a location of a camera on an autonomous vehicle;
    selecting reference points from the plurality of projected reference points such that the selected reference points form a polygon that surrounds an object in the 2D image, wherein selecting the reference points comprises performing one or more 2D point-in-polygon tests to determine the selected reference points making up the polygon that surrounds the object in the 2D image;
    determining a location of the object in the environment based on a determined intersection point of a ray directed toward the object; and
    providing instructions to control the autonomous vehicle based on the determined location of the object in the environment.

2. The method of claim 1, wherein selecting the reference points comprises selecting three reference points that form a triangle that surrounds the object in the 2D image, wherein determining the intersection point of the ray directed toward the object and the 3D polygon formed by the previously stored 3D locations of the selected reference points comprises:
    determining a plane that contains the previously stored 3D locations of the three selected reference points; and
    determining the intersection point based on a single ray-plane intersection between the ray directed toward the object and the plane that contains the previously stored 3D locations of the three selected reference points.

3. The method of claim 1, wherein the ray directed toward the object comprises a ray directed toward a center pixel of the object.

4. The method of claim 1, wherein the underlying surface of the environment for which the 3D locations of the plurality of reference points were previously stored comprises a road in the environment.

5. The method of claim 4, wherein the object comprises a portion of a different vehicle, and wherein the method further comprises determining a location of the different vehicle based on the location of the object in the environment.

6. The method of claim 1, further comprising:
    retrieving previously stored 3D locations of one or more continuous curves in the environment; and determining the 3D locations of the plurality of reference points by sampling the one or more continuous curves at one or more intervals.

7. The method of claim 6, wherein the one or more continuous curves comprise a first lane boundary and a second lane boundary of a road within the environment, and wherein selecting the reference points comprises selecting at least one reference point on the first lane boundary and at least one reference point on the second lane boundary.

8. The method of claim 7, wherein selecting the reference points comprises selecting two reference points on the first lane boundary and one reference point on the second lane boundary to form a triangle that surrounds the object in the 2D image.

9. The method of claim 1, wherein selecting the reference points comprises sequentially considering individual reference points of the plurality based on distance to the object within the 2D image.

10. A vehicle, comprising:
a camera configured to capture a two-dimensional (2D) image of a portion of an environment, wherein the image contains an object; and
a computing system configured to:
project a plurality of reference points into a 2D image based on previously stored 3D locations of the plurality of reference points and a location of a camera on an autonomous vehicle;
select reference points from the plurality of projected reference points such that the selected reference points form a polygon that surrounds an object in the 2D image, wherein selecting the reference points comprises performing one or more 2D point-in-polygon tests to determine the selected reference points making up the polygon that surrounds the object in the 2D image;
determine a location of the object in the environment based on a determined intersection point of a ray directed toward the object; and
provide instructions to control the vehicle based on the determined location of the object in the environment.

11. The vehicle of claim 10, wherein the computing system is configured to determine the intersection point of the ray directed toward the object and the 3D polygon formed by the previously stored 3D locations of the selected reference points by:
determining a plane that contains the previously stored 3D locations of the three selected reference points; and
determining the intersection point based on a single ray-plane intersection between the ray directed toward the object and the plane that contains the previously stored 3D locations of the three selected reference points.

12. The vehicle of claim 10, wherein the underlying surface of the environment for which the 3D locations of the plurality of reference points were previously stored comprises a road in the environment.

13. The vehicle of claim 10, wherein the computing system is further configured to:
retrieve previously stored 3D locations of one or more continuous curves in the environment; and
determine the 3D locations of the plurality of reference points by sampling the one or more continuous curves at one or more intervals.

14. A non-transitory computer readable medium having stored therein instructions, that when executed by a computing system, cause the computing system to perform functions comprising:
projecting a plurality of reference points into a 2D image based on previously stored 3D locations of the plurality of reference points and a location of a camera on an autonomous vehicle;
selecting reference points from the plurality of projected reference points such that the selected reference points form a polygon that surrounds an object in the 2D image, wherein selecting the reference points comprises performing one or more 2D point-in-polygon tests to determine the selected reference points making up the polygon that surrounds the object in the 2D image;
determining a location of the object in the environment based on a determined intersection point of a ray directed toward the object; and
providing instructions to control the autonomous vehicle based on the determined location of the object in the environment.

15. The non-transitory computer readable medium of claim 14, wherein determining the intersection point of the ray directed toward the object and the 3D polygon formed by the previously stored 3D locations of the selected reference points comprises:
determining a plane that contains the previously stored 3D locations of the three selected reference points; and
determining the intersection point based on a single ray-plane intersection between the ray directed toward the object and the plane that contains the previously stored 3D locations of the three selected reference points.

16. The non-transitory computer readable medium of claim 14, wherein the ray directed toward the object comprises a ray directed toward a center pixel of the object.

17. The non-transitory computer readable medium of claim 14, wherein the underlying surface of the environment for which the 3D locations of the plurality of reference points were previously stored comprises a road in the environment.

* * * * *